(12) United States Patent
Cheung et al.

(10) Patent No.: US 10,099,396 B2
(45) Date of Patent: Oct. 16, 2018

(54) MOTORIZED SPIRAL CUTTING DEVICE

(71) Applicant: Huiyang Allan Plastic & Electric Industries Co., Limited, Huizhou, Guangdong (CN)

(72) Inventors: Shu Sang Cheung, Huizhou (CN); Xian Liang Ou Yang, Huizhou (CN); Gang Zhi Liu, Huizhou (CN)

(73) Assignee: Huiyang Allan Plastic & Electric Industries Co., Limited, Guangdong (CN)

( * ) Notice: Subject to any disclaimer, the term of this patent is extended or adjusted under 35 U.S.C. 154(b) by 48 days.

(21) Appl. No.: 15/447,053

(22) Filed: Mar. 1, 2017

(65) Prior Publication Data

US 2017/0252936 A1    Sep. 7, 2017

(30) Foreign Application Priority Data

Mar. 1, 2016  (CN) .......................... 2016 1 0114160

(51) Int. Cl.
*B26D 3/11*    (2006.01)
*B26D 5/08*    (2006.01)
(Continued)

(52) U.S. Cl.
CPC ................. *B26D 3/11* (2013.01); *A47J 17/14* (2013.01); *B26D 1/03* (2013.01); *B26D 3/185* (2013.01); *B26D 3/283* (2013.01); *B26D 5/086* (2013.01); *B26D 7/0666* (2013.01); *B26D 2003/286* (2013.01); *B26D 2003/288* (2013.01);
(Continued)

(58) Field of Classification Search
CPC .. Y10S 83/932; Y10T 83/658; Y10T 83/6667; Y10T 83/4506; Y10T 83/463; Y10T 83/4632; Y10T 83/4637; Y10T 83/8812; A47J 17/14; A47J 17/16; B26D 3/11; B26D 3/185; B26D 3/283; B26D 3/10; B26D 1/03; B26D 5/086; B26D 7/0666; B26D 7/0608; B26D 2003/286;
(Continued)

(56) References Cited

U.S. PATENT DOCUMENTS 3,211,202 A * 10/1965 Mason .................... A47J 17/16
83/425.1
3,952,621 A *  4/1976 Chambos ................. B26D 1/03
83/408
(Continued)

FOREIGN PATENT DOCUMENTS

CN       02214379.3 Y    3/2003
CN    201420273425.5    5/2014

*Primary Examiner* — Phong Nguyen
(74) *Attorney, Agent, or Firm* — Intellectual Property Law Group LLP

(57) ABSTRACT

A food spiral cutting machine includes a base, a drive unit, a screw, a cutter assembly and a locking device. The drive unit comprises a motor, a gearbox and an open drive nut. The gearbox comprises a planetary gear reduction group and a pair of bevel gears. A first bevel gear connects to the output of the planetary gear set, and the first bevel gear drives a second bevel gear which is provided with a spline inside the gear center hole. The first bevel gear meshes with the second bevel gear at right angle. An open drive nut rests on the underside of the screw. A screw is provided with a slot along the screw axis. The spline of the second bevel gear keys with the slot of the screw.

9 Claims, 4 Drawing Sheets

(51) Int. Cl.
*B26D 3/28* (2006.01)
*B26D 7/06* (2006.01)
*B26D 1/03* (2006.01)
*B26D 3/18* (2006.01)
*A47J 17/14* (2006.01)

(52) U.S. Cl.
CPC ......... *B26D 2210/02* (2013.01); *Y10S 83/932* (2013.01); *Y10T 83/4632* (2015.04); *Y10T 83/6667* (2015.04)

(58) Field of Classification Search
CPC ........ B26D 2003/288; B26D 2003/287; B26D 2210/02
See application file for complete search history.

(56) References Cited

U.S. PATENT DOCUMENTS

| | | | | |
|---|---|---|---|---|
| 4,441,411 A * | 4/1984 | Mullins, Jr. | ............... | B26D 3/11 99/537 |
| 4,753,159 A * | 6/1988 | Eaton | ....................... | A47J 17/16 460/51 |
| 5,097,758 A * | 3/1992 | Fresh | ....................... | A47J 17/16 241/169 |
| 5,784,942 A * | 7/1998 | Jones | ....................... | B26D 1/02 83/733 |
| 6,096,360 A * | 8/2000 | Dieso | ....................... | B26D 3/11 426/518 |
| 6,484,627 B1 * | 11/2002 | Peter | .................... | B26B 29/063 99/419 |

* cited by examiner

MOTORIZED SPIRAL CUTTING DEVICE

CROSS-REFERENCE TO RELATED APPLICATION

This application claims benefit of China patent application no. 201610114160.8 filed Mar. 1, 2016, the disclosure of which his hereby incorporated by reference in its entirety for all purposes.

BACKGROUND OF THE INVENTION

1. Field of Invention

The present invention relates to a cutter assembly, particularly a food spiral cutting machine.

2. Background

Fruits and vegetables such as apples, potatoes, or carrots usually require some kind of processing before cooking or serving. These preparation processes include peeling, cutting, slicing, shredding, etc. At present the majority of food cutter assemblies used in the kitchen are hand-operated cutter assemblies.

Chinese patent application, publication number CN02214379.3, discloses a vegetable and fruit peeling machine, with its vertical fixed on the base frame, with a guide screw through the upper frame; the guide screw has a fork at one end and a handle fixed at the other end; a cutting knife is arranged at the end of the bracket. The vegetable and fruit peeling machine is operated by rotating the crank push screw, using the blades at the end of the rack to peel fruit on the fork. By using a hand driven lead screw, the manual process is inefficient and has a high manpower cost. The weaknesses of the fruit and vegetable peeler become more apparent when it is used to process large amounts of food.

In order to overcome these problems, people developed the electric cutter. Chinese patent CN201420273425.5 discloses an electric spiral cutting machine. The machine comprises: a base, a main frame fixed on the base, positioning rod pieces and electric drive pieces; a main frame set cutting tool; positioning rod pieces and main frame thread connection, where the positioning rod pieces can move relative to the main frame; the electric drive pieces are arranged at one end of the positioning rod pieces, and are used for driving the positioning rod pieces to rotate.

The electric spiral cutting machine can improve the efficiency of processing of fruits and vegetables. However, there exist the following problems:

(1) Electric drive pieces of an electric spiral cutting machine are arranged at the end of the positioning rod pieces to direct drive positioning rod pieces, their driving force is small, with a low working efficiency, and the unit is bulky.

(2) During working of the electric spiral cutting machine, the electric drive pieces need to be moved forward with the positioning rod pieces, the positioning rod pieces and the main frame are supported by a base only. Therefore, when fruits and vegetables that have been placed into the positioning rod pieces and the electric spiral cutting machine for cutting work, users need a hand or other device to make the electric spiral cutting machine stable. The electric spiral cutting machine has the problems of an unstable center of gravity, poor balance and complicated operation.

(3) The positioning rod pieces and main frame use a threaded connection. As a result, reverse rotation of the positioning rod pieces is required to return the main frame back to its original position in order to start another cutting cycle. This process takes time and is inconvenient.

(4) The main frame will shake when the positioning rod is forward relative to the main frame, the slicer is set up in the main frame, which easily causes a poor cutting effect of the electric cutter.

(5) The main frame limits the size of fruits and vegetables that can be processed. The poor stability of the whole structure means that the machine would not be good at processing large-sized fruits and vegetables.

SUMMARY OF THE INVENTION

The present invention provides a food spiral cutting machine. The food spiral cutting machine has a simple structure with an innovative screw driving mechanism; thereby providing a device that can spiral cut various kinds of fruits or vegetables effectively and efficiently.

A food spiral cutting machine according to an embodiment of the present invention comprises a base, a drive unit, a screw, a cutter assembly and a locking device; the drive unit comprises a motor, gear box and an open drive nut; the gear box comprises a planetary gear reduction group and a pair of bevel gears, a first bevel gear connects to the output of a planetary gear set and a second bevel gear is provided with a spline. The second bevel gear is driven by the first bevel gear. The first and second bevel gears mesh at a right angle.

A screw is provided with a slot along the screw. The screw passes through the second bevel gear where the spline of the second bevel gear keys to the slot of the screw such that when the second bevel gear rotates, the screw also rotates.

In addition, the screw rests on the open drive nut so that the rotation of the screw causes the screw to move forward. As the screw moves forward over the open drive nut, the screw is simultaneously moving through the second bevel gear, as guided by the spline of the second bevel gear.

Further, the open drive nut is pressed against the screw under spring tension. This allows the open drive nut to be disengaged from the screw by pressing the release button. When the button is pressed, and the open drive nut disengaged, the user can easily pull back the screw to the starting position, for example to set up a piece of carrot for spiral cutting. This also allows the user to set up a piece of fruit or vegetable, of various lengths, for spiral cutting.

Further, the first bevel gear and the second bevel gear are bevel gears. Using two bevel gears constituting the transmission mechanism to change the direction of transmission, the motor can be installed in the bottom (i.e. below) of the screw.

Further, the cutter assembly connected to the base is detachable. This allows easy removal of the cutter assembly from the base for cleaning or storage.

Further, one end of the screw is provided with a spikey disk for fixing food. The spikey disk is connected to the screw by a simple twist-lock fitting. The user can easily remove the spikey disk from the screw for cleaning or storage.

The food spiral cutting machine of the present invention has the following beneficial effects:

(1) The drive unit of the food spiral cutting machine of the invention has the advantages of a simple structure and can achieve rotation of the screw with simultaneous linear displacement along the screw axis. This simultaneous rotation and linear displacement allows fruits or vegetable to be continuously cut in a spiral.

(2) The food spiral cutting machine of the present invention allows for fruits or vegetables of various sizes and length to be spirally cut continuously.

(3) The food spiral cutting machine of the invention enables the user to conveniently spiral cut fruits and vegetables safely, quickly, and consistently.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention.

Figure 1:
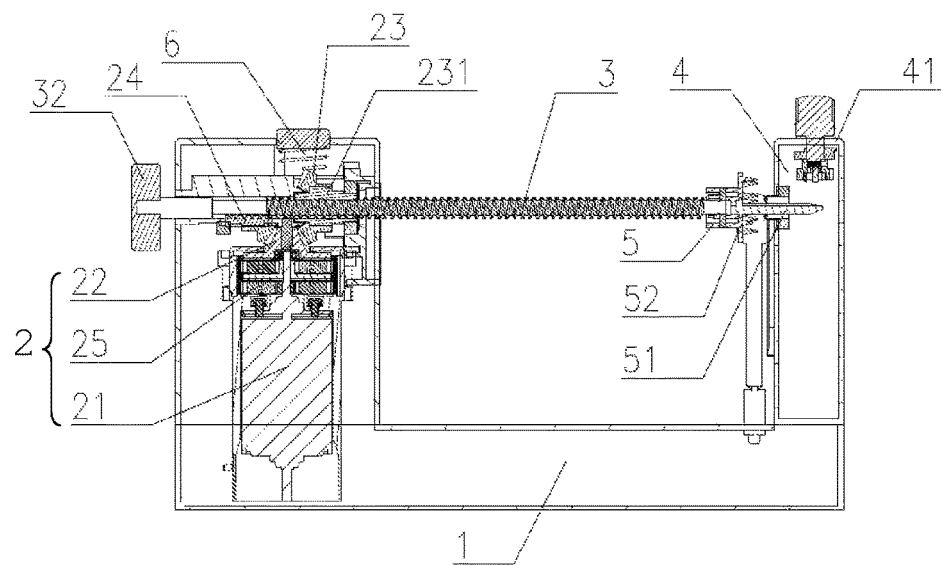
FIG. 1 is a sectional view of a food spiral cutting machine, according to an embodiment of the present invention.
Figure 2:
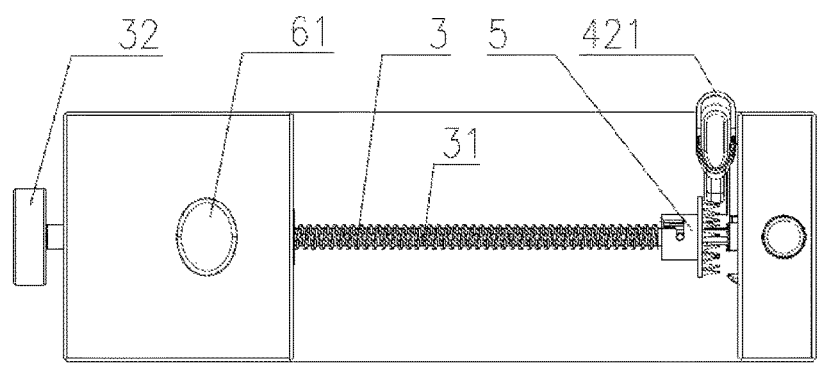
FIG. 2 is a top view of a food spiral cutting machine, according to an embodiment of the present invention.

As shown in FIGS. 1-2, according to a preferred embodiment, the invention of a food spiral cutting machine, includes a base 1, a drive unit 2, a screw 3 and a cutter assembly 4; its characteristics are described in the drive unit 2, including a motor 21, a gear box 25 and an open drive nut 24. The gear box 25 includes a first bevel gear 22 and a second bevel gear 23; the first bevel gear 22 meshing with the second bevel gear 23. The motor 21 provides drive to the first bevel gear 22 via a planetary gear set; the screw 3 goes through the second bevel gear 23; the second bevel gear 23 is provided with a spline 232; the screw 3 is provided with a slot 31; and the spline 232 keys with the slot 31.

Therefore, the first bevel gear 22 can be driven by the motor 21 and the first bevel gear 22 drives the second bevel gear 23 to rotate. The spline 232 of the second bevel gear 23 is keyed to the slot 31 on the screw 3, and the rotation of the second bevel gear 23 can drive the screw 3 to rotate. The screw 3 is driven to move forward or backward by its interaction with the open drive nut 24. The drive unit 2 of the food spiral cutting machine achieves the rotation of the screw 3 with simultaneously linear displacement. With a fruit or vegetable held in place by the spikey disk, the screw can drive the fruit or vegetable against the cutter assembly, thereby producing the spiral cutting.

Figure 3:
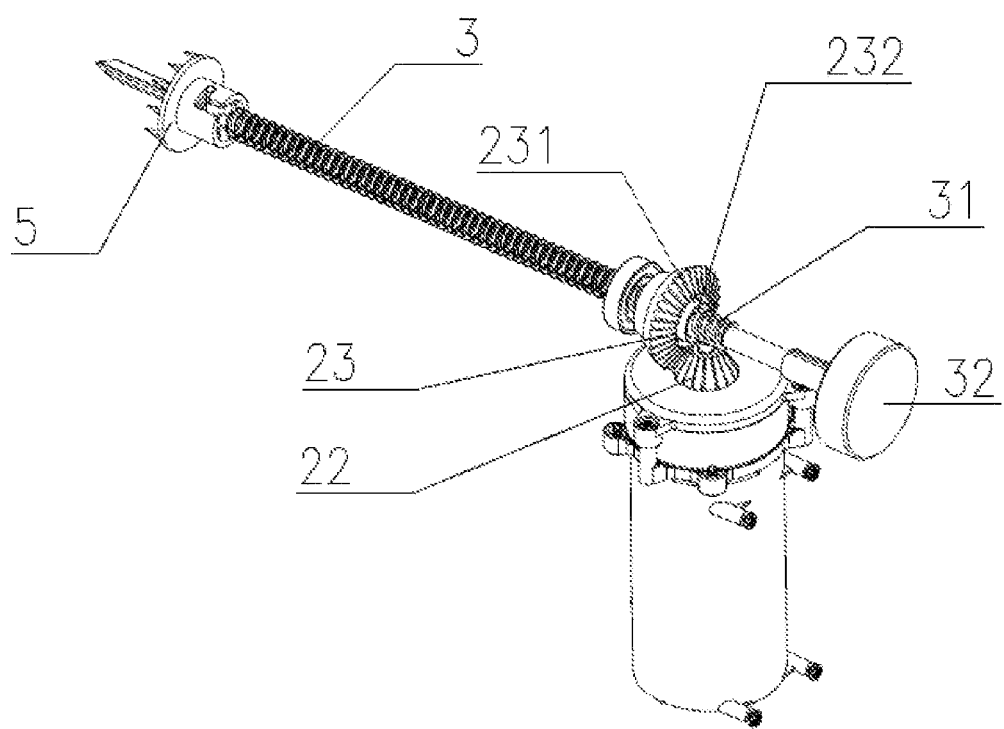
FIG. 3 is an isometric view of the drive unit and the screw of the food spiral cutting machine, according to an embodiment of the present invention.
Figure 4:
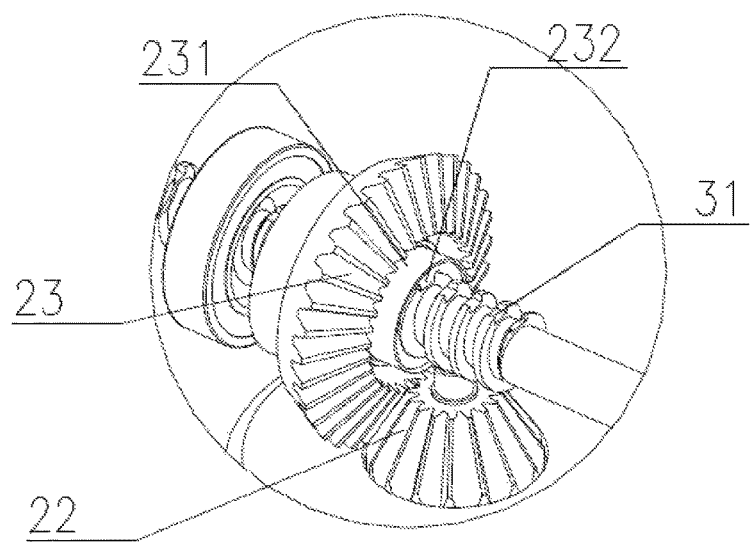
FIG. 4 is a partially enlarged diagram of FIG. 3.
Figure 5:
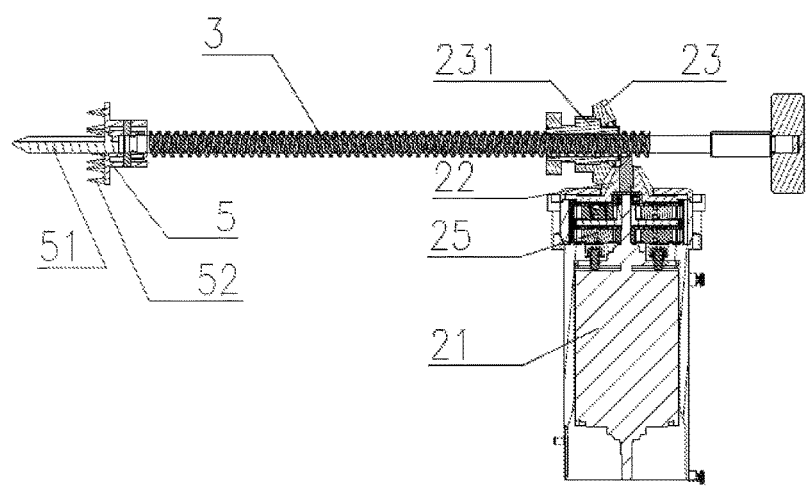
FIG. 5 is sectional view of FIG. 3.

As shown in FIGS. 3-5, the first bevel gear 22 and the second bevel gear 23 are bevel gears. This bevel gear arrangement in the gear box has the advantages of high load bearing capacity, stable transmission, compact structure, space saving, long service life and low noise.

Using two bevel gears in the transmission mechanism allows the direction of transmission to be changed, which enables the motor to be installed in the bottom of the screw rather than in line with the screw. As a result, the volume of the whole machine is reduced, and the stability of the whole machine is improved. Preferably, the projection 232 of the second bevel gear 23 is a spline. Using a spline can increase the contact area between the second bevel gear 23 and the screw, thus enhancing the driving force of the second bevel gear 23 on the screw and improving the driving effect.

In another preferred embodiment, the center of the second bevel gear 23 is provided with a bushing 231. The spline is arranged on the inner wall of the bushing 231. Screw 3 passes through the bushing 231, and the slot 31 of the screw 3 and the bushing 231 of the spline engages.

Figure 6:
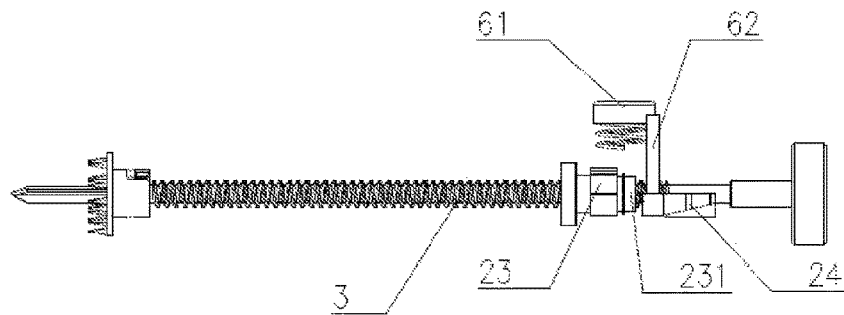
FIG. 6 is a side view of a screw, an open drive nut and a locking device of a food spiral cutting machine, according to an embodiment of the present invention.

FIG. 6 shows the screw 3 and the open drive nut 24 of the food spiral cutting machine. The open drive nut 24 and the screw 3 are engagable to facilitate the rotation and linear displacement of the fruit or vegetable fitted to the spikey disk.

The spline 232 of the second bevel gear 23 is engaged with the slot 31 on the screw 3, and the rotation of the second bevel gear 23 can drive the screw 3 to rotate, and the screw 3 is driven to move forward or backward as the open drive nut 24 is engaged to mesh with the screw 3.

Figure 7:
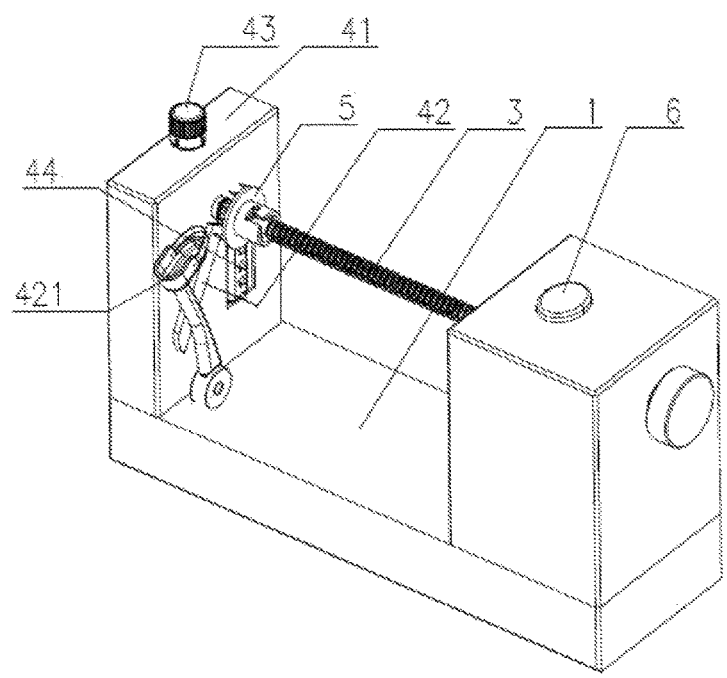
FIG. 7 is an isometric view of the food spiral cutting machine with cutter assembly, according to an embodiment of the present invention.

As shown in FIG. 6 and FIG. 7, the food spiral cutting machine also comprises a locking device 6 which is used for controlling the engagement and separation of the open drive nut 24 and the screw 3.

The locking device 6 includes a release button 61, a spring (not shown) and a connecting rod 62. The release button 61 is connected with the connecting rod 62 through a spring. The connecting rod 62 is connected with the open drive nut 24. In normal use the open drive nut 24 is configured to mesh with the screw 3. However when required, for example to setup a piece of fruit or vegetable for spiral cutting, the user can press the release button 61 so that the open drive nut 24 is disengaged from the screw 3. This allows the screw to be pulled or pushed along the screw axis.

The drive unit and the cutter assembly 4 are respectively arranged on opposing ends of the base 1. The screw 3 is parallel to the base 1. The drive unit can realize the change of the driving direction by using the two bevel gears, so that the drive unit can be connected with the base 1, and the stability of the whole machine of the food spiral cutting machine is improved.

The cutter assembly 4 and the drive unit are respectively connected with the two ends of the base 1, which can reduce the shaking of the food spiral cutting machine at work, improve the stability and balance of the whole machine, thereby increasing the carrying capacity of the whole machine. Therefore, the food spiral cutting machine of the present invention can be applied to process fruits and vegetables of various sizes and lengths.

One end of the screw 3 is provided with a spikey disk 5 for fixing food, and the other end is provided with a knob 32. The spikey disk 5 is connected to the screw 3 by twist-lock; although other suitable means can be employed. Therefore, the quick release of the spikey disk 5 of the spiral cutting machine ensures that replacement, disassembly and cleaning are very convenient.

The spikey disk 5 is also provided with a plurality of circumferential spikes 52, which can be fixed on the spikey disk 5.

The cutter assembly 4 is fitted on the base 1 and can form a detachable connection. A detachable connection between the cutter assembly 4 and the base 1 is conducive to the installation and removal of the cutter assembly 4. In addition, when the cutter assembly 4 is damaged, the assembly can simply be replaced, thus reducing the cost of replacement parts.

The cutter assembly 4 comprises a bracket 41 and a cutting tool. The bracket 41 is connected to the base 1. The cutting tool includes a peeling component. The peeling component comprises a peeler blade 421 and an elastic piece. The peeler blade 421 is connected with the elastic piece. The peeler blade 421 is arranged on the outer side of the upper part of bracket 41. The restoring force of the elastic member is biased towards the axial direction of the screw 3.

The peeler blade 421 is arranged on the outer side of the upper part of bracket 41, and the elastic part can make the peeler blade 421 to be in full contact with the fruit or vegetable as driven by the screw 3. Therefore, the food spiral cutting machine of the embodiment can peel the different sizes of the ingredients, and effectively improve the peeling effect. Further, the peeler blade 421 can be used with a miniature blade, which can improve the accuracy of the peeling of the ingredients.

The cutter assembly 4 also includes a cutter disk 42. The cutter disk 42 and the axial direction of the screw 3 are perpendicular to each other, so that the cutter disk 42 can be in full contact with the fruit or vegetable to be processed. The cutter disk 42 includes a plurality of blades and blade types, including knife slicing and shredding cutter etc., which can apply different cutting processing to the food. The cutter assembly 4 is provided with positioning holes.

In summary, the present invention has the advantages of an ingenious structure and high processing efficiency. The invention also has the advantages of simple structure, good driving effect, strong stability, good balance, simple operation and the like.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

REFERENCE NUMERALS 1 base,
21 motor,
22 first bevel gear,
23 second bevel gear,
231 bushing,
232 spline,
24 open drive nut,
25 gear box,
3 screw,
31 slot,
32 knob,
4 cutter assembly,
41 bracket,
421 peeler blade,
42 cutter disk,
43 julienne knob,
44 julienne grid,
5 spikey disk,
51 center pin,
52 circumferential spikes,
6 locking device,
61 release button,
62 connecting rod.

What is claimed is:

1. A food spiral cutting machine comprising a base (1), a drive unit (2), a screw (3), a cutter assembly (4) and a locking device (6);
   wherein the drive unit (2) comprises a motor (21), a gear box (25) and an open drive nut (24);
   wherein the gear box (25) comprises a planetary gear reduction group and a first bevel gear (22) and a second bevel gear (23) that mesh at a right angle, said second bevel gear (23) is provided with a spline (232) inside a center hole of the second bevel gear;
   wherein the open drive nut (24) is configured to mesh with the screw (3);
   wherein the screw (3), which is provided with a slot (31), passes through the second bevel gear, where the slot (31) keys to the spline (232) and engages with the open drive nut; and
   wherein an output of the planetary gear reduction group drives the second bevel gear (23) via the first bevel gear (22), such that the rotation of the second bevel gear with the spline (232) rotates the screw (3) and the screw (3), which is resting on the open drive nut (24), moves forward.

2. The food spiral cutting machine of claim 1, wherein the spline (232) is a protrusion along the axis inside the second bevel gear.

3. The food spiral cutting machine of claim 2, wherein the second bevel gear (23) is provided with a bushing (231), the bushing (231) is provided with a spline; the screw (3) passes through the bushing (231).

4. The food spiral cutting machine of claim 1, wherein the locking device (6) controls meshing and disengagement of the screw (3) to the open drive nut (24); the locking device (6) include a release button (61), a spring and a connecting rod (62), the connecting rod (62) is connected to the open drive nut (24).

5. The food spiral cutting machine of claim 4, wherein the screw (3) rests on the open drive nut (24) and pressing the release button (61) disengages the screw from the open drive nut (24).

6. The food spiral cutting machine of claim 5, wherein a thread of screw (3) meshes to the open drive nut (24), with at least a 2 pitch width of gear mesh engagement.

7. The food spiral cutting machine of claim 1, wherein the cutter assembly (4) and the base (1) are connected for spiral cutting; preferably the cutter assembly (4) is detachable from the base (1).

8. The food spiral cutting machine of claim 7, wherein the cutter assembly (4) includes a peeler (421), a julienne knob (43) and a julienne grid (44) which provides different sized julienne forming, and a cutter disc (42) which provides slice and shred forming.

9. The food spiral cutting machine of claim 1, wherein a spikey disk (5) is pushed into a fruit or a vegetable so as to drive the fruit or the vegetable against the cutter assembly for spiral cutting; the spikey disk (5) is removable from the screw (3).

* * * * *